Feb. 13, 1934.  A. C. LINDGREN ET AL  1,946,656
STRAW WINDROWER FOR HARVESTER-THRESHERS
Filed Oct. 26, 1932  3 Sheets-Sheet 1

Feb. 13, 1934.  A. C. LINDGREN ET AL  1,946,656
STRAW WINDROWER FOR HARVESTER-THRESHERS
Filed Oct. 26, 1932  3 Sheets-Sheet 3

Inventors
Alexius C. Lindgren
Clemma R. Raney

Patented Feb. 13, 1934

1,946,656

UNITED STATES PATENT OFFICE 1,946,656

STRAW WINDROWER FOR HARVESTER THRESHERS

Alexus C. Lindgren, Chicago, and Clemma R. Raney, Riverside, Ill., assignors to International Harvester Company, a corporation of New Jersey Application October 26, 1932. Serial No. 639,725

9 Claims. (Cl. 56—122)

The invention relates to a straw windrowing attachment for harvester threshers.

Such attachments are located at the straw discharge end of the harvester thresher to catch the straw coming out of the thresher part and to move it in a manner to accumulate it in windrows, as the harvester thresher travels along. Accordingly, the straw can subsequently be picked up with a hay loader, or other pick-up device, to be gathered and stored for various farm uses, where it is desired to save and use the straw, rather than have such straw scattered onto the field directly from the harvester thresher to be plowed under for fertilizer.

The object of the present invention is to provide a wheel carried trailing straw windrower to be drawn rearwardly of the thresher part of the harvester thresher, said windrower comprising a pair of transversely aligned conveyers having their adjacent or inner ends located directly under the straw deflector hood of the thresher part so that said conveyers receive the straw to deliver it transversely of the line of travel to either side of the machine to form a windrow.

Another object is to provide means for driving the conveyers and to make only one conveyer operative at a time;

Another object is to hingedly mount the stubblewardmost conveyer for vertical folding movement.

Another object is to provide a deflector between the two conveyers underneath the straw dump hood, so that all the straw must be delivered to only one of the conveyers at a time.

Other objects will become apparent to those skilled in this art as the disclosure is more fully made.

These desirable objects may be achieved by the illustrative example of the invention shown in the accompanying sheets of drawings, in which.

Figure 1:
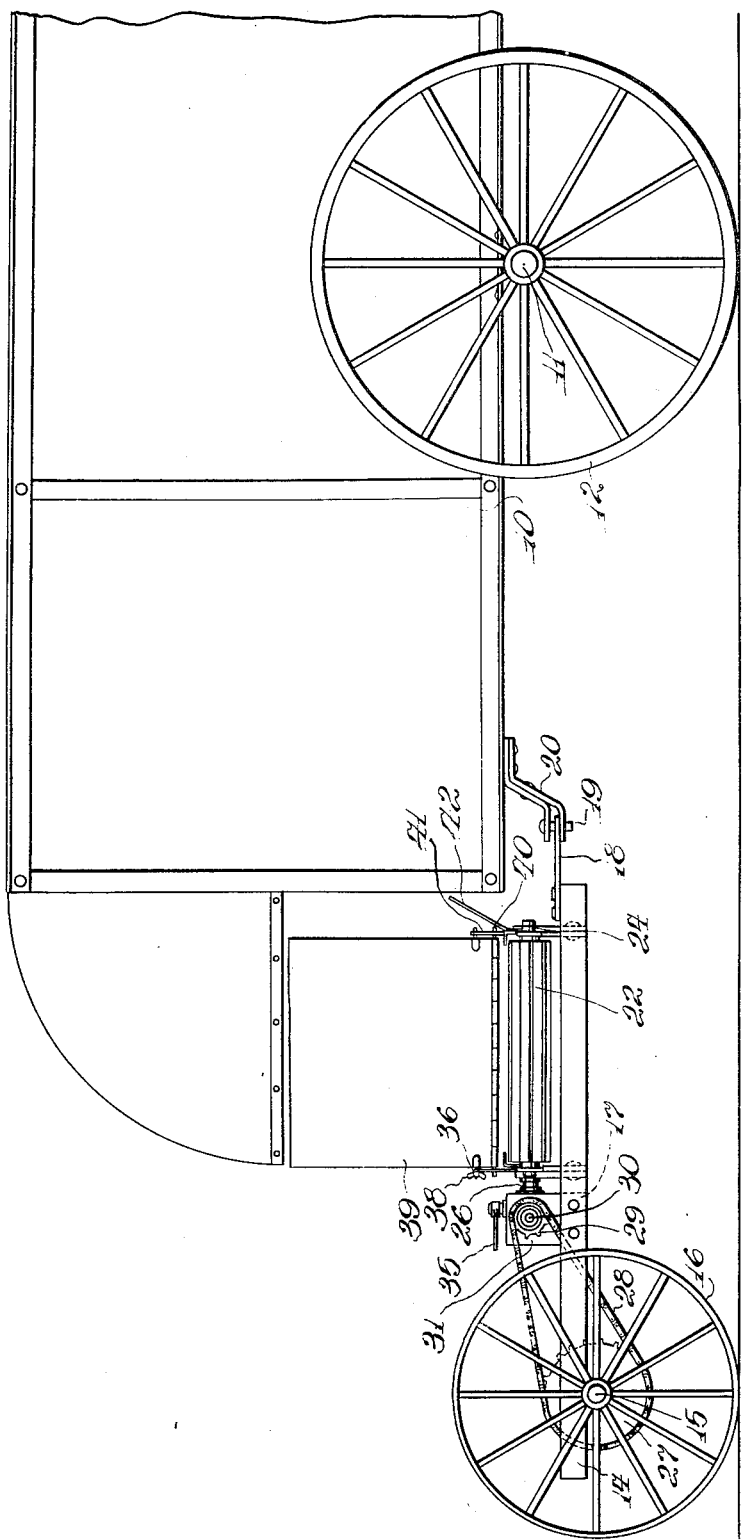
Figure 1 is a side elevational view of the rear, thresher part end of a harvester thresher with the improved straw windrower connected thereto in trailing relationship.
Figure 2:
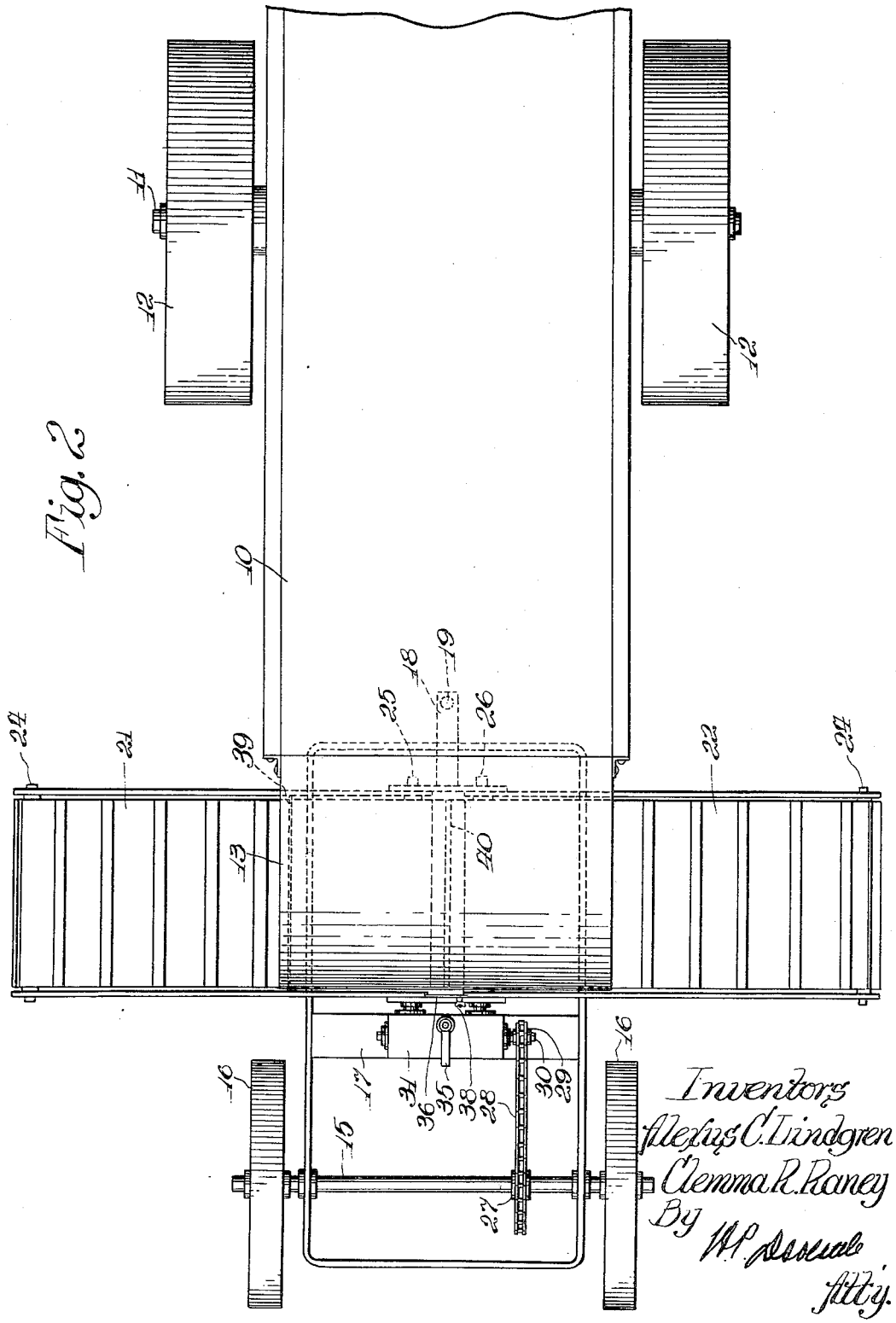
Figure 2 is a similar view, but showing the parts in plan.

The harvester thresher herein is represented by its thresher part 10 carried on the usual transverse axle 11 journaled in wheels 12, the rear or straw discharge end of the thresher carrying the usual straw dumping, or deflecting, hood 13.

The windrowing attachment comprises a substantially rectangular frame 14 carried at its rear end on a transverse axle 15 that turns with a pair of wheels 16, in which it is carried. The frame 14 also embodies a transverse cross-piece 17 and a draw element 18 at its front end adapted to be pivotally and detachably connected by a vertical pin 19 to a draft element 20 located underneath the rear end of the thresher, as shown.

On the frame 14, in advance of the plate 17 and arranged transversely end to end, are two endless, apron type conveyers 21 and 22, said conveyers having their adjoining inner ends located directly below the hood 13, to receive the straw coming therefrom, in a manner later to appear. It will be seen that these conveyers project, respectively, stubblewardly and grainwardly a distance beyond the sides of the hood 13, and also beyond the line of travel of the wheels 12. The stubbleward conveyer 21 is hingedly mounted at its inner end so that it may be lifted and folded up vertically, as indicated in the dotted lines in Figure 3, and be retained in such folded position by any suitable stay device 23 connected to the adjacent side of the thresher part 10.

The outer end of each conveyer 21, 22 carries, respectively, idler roller shafts 24, around which the endless conveyers are trained, while the inner end of the conveyer 21 is trained around a driven roller shaft 25, and the adjacent end of the conveyer 22 is trained around a driven roller shaft 26. The manner of driving these conveyers will next be described.

Figure 4:
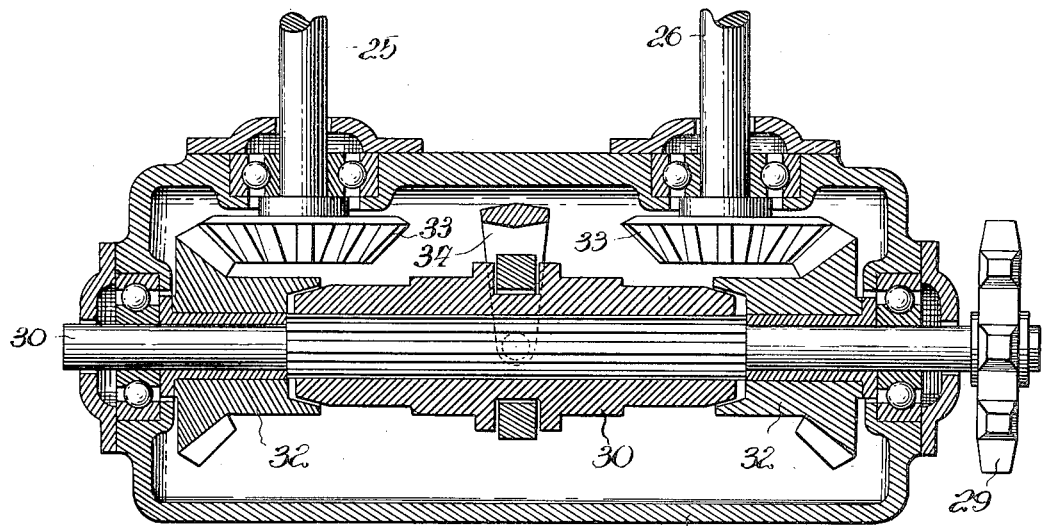
Figure 4 is a detail, horizontal sectional view through the gear drive arrangement for driving and controlling the two conveyers.

The axle 15 turns a sprocket wheel 27, which it carries, to drive a chain 28, in turn driving a sprocket wheel 29 on the protruded end of a shaft 30 (see Figure 4) journaled transversely in a casing 31 mounted on the frame plate 17. Loose on either end of the shaft 30 are combination bevel gear and cone clutch elements 32 geared to bevel pinions 33 carried, respectively, by the driven roller shafts 23, 26 heretofore described, which, as shown, are extended into the case 31. Between the elements 32, the shaft 30 is splined slidingly to carry a clutch element 30' always rotating with the shaft 30, and movable into engagement by means of a shifter fork 34 operable by an exterior handle 35, to drive either gear 32 in an obvious manner, to turn one or the other of the roller shafts 25, 26.

Carried in any suitable manner at the rear edge of the conveyers 21, 22 where they meet at their inner ends, is a vertical, transverse plate 36 having an arcuate slot 37. In this slot is fitted a wing nut 38 on a stem that is fixed in the rear edge of a divider board 39. When the wing nut 38 has been loosened, the board 39 may be swung to one side or the other of its longitudinal hinge 40 carried in the plate 37 and a similar plate 41 at the front side of the conveyers. A shield 42 may be provided along the front edge of the conveyers, if desired.

Figure 3:
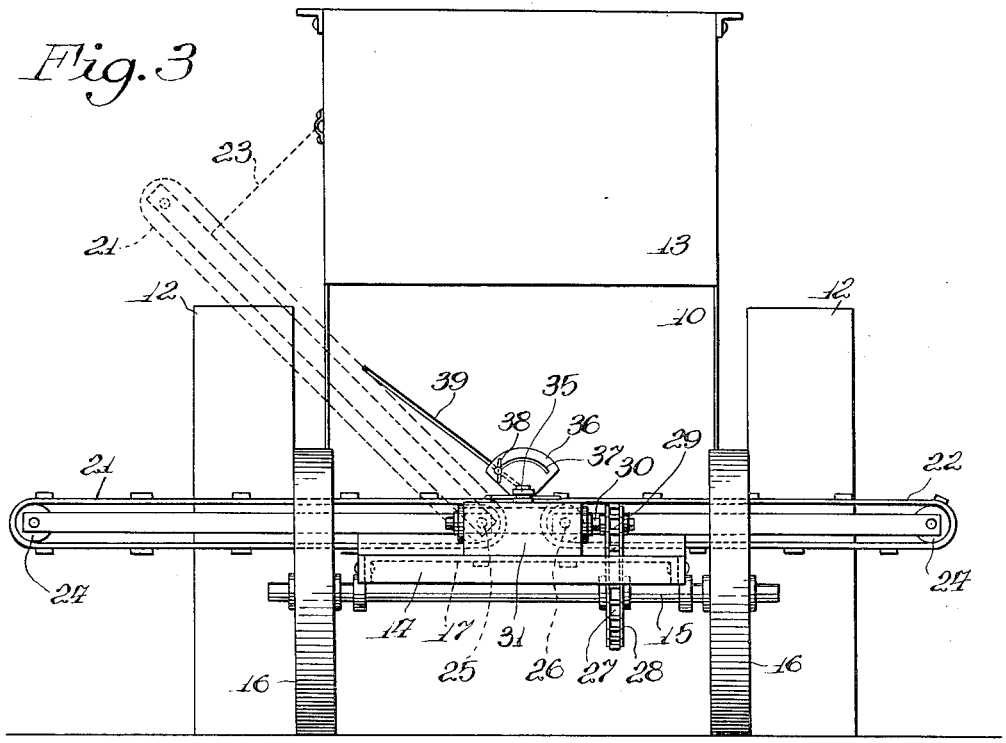
Figure 3 is a rear elevational view.

In use and operation, if it is desired to save the straw and arrange it in windrows on the field, the attachment is coupled to the thresher 10 by means of the pin 19, as shown in Figure 1. On the first round of the harvester thresher, the conveyers 21 and 22 will be in the positions shown, and the divider board 39 will be tilted and held to the left, as shown in Figure 3, so that all the straw discharging from the hood 13 must fall onto the conveyer 22 which is being driven, the operator first having set the fork 34 to engage the clutch element 30' in engagement with the gear 32 that drives the shaft 26 for said conveyer. The conveyer moves the straw in a grainward direction and discharges the same in a windrow along the grainward side of the thresher 10. On the next round, the board 39 will be tilted to the right, as shown in Figure 3, to cause all the straw to fall onto the other conveyer 21, which moves the straw stubblewardly when the clutch element 30' has been shifted to drive the shaft 25. The straw is now discharged stubblewardly of the harvester thresher directly onto the first round windrow formed, so that a double layer windrow is formed. To accomplish this, of course, the length of the conveyers must be predetermined.

The ground wheel drive proportions the speed of travel of the conveyers to the speed of travel of the harvester thresher, which is, of course, advantageous.

When it is desired to run a wagon alongside the stubbleward side of the harvester thresher to empty its grain tank, or, when it is desired to narrow the over-all width of the machine for travel clearance and transportation through narrow places, the hingedly mounted conveyer 21 can be folded by swinging the same upwardly, as shown in the dotted lines in Figure 3, the same being so held in place by a rod, or other stay device 23.

And so on then, by flipping the divider board 39 and clutch 30', these two conveyers can be used to lay a double windrow to facilitate the gathering operation.

From this disclosure it will now be clear that an improved windrow harvesting attachment has been provided, which achieves all of the desirable objects heretofore recited.

It is the intention to cover all such changes and modifications which do not depart from the spirit and scope of the invention set forth in the appended claims.

What is claimed is:

1. A straw windrowing attachment for harvester threshers, said attachment comprising a wheel carried frame adapted to be trailed behind the thresher part of the harvester thresher, and a pair of conveyers arranged transversely end to end on said frame in position to receive the straw from the thresher part.

2. A straw windrowing attachment for harvester threshers, said attachment comprising a wheel carried frame adapted to be trailed behind the thresher part of the harvester thresher, and a pair of conveyers arranged transversely end to end on said frame in position to receive the straw from the thresher part, one of said conveyers being pivotally mounted at its inner end whereby it may be folded upwardly to narrow the width of the attachment.

3. A straw windrowing attachment for harvester threshers, said attachment comprising a wheel carried frame adapted to be trailed behind the thresher part of the harvester thresher, a pair of conveyers arranged transversely end to end on said frame in position to receive the straw from the thresher part, and means to drive the conveyers from the ground by the travel of said wheel carriage.

4. A straw windrowing attachment for harvester threshers, said attachment comprising a wheel carried frame adapted to be trailed behind the thresher part of the harvester thresher, a pair of conveyers arranged transversely end to end on said frame in position to receive the straw from the thresher part, means to drive the conveyers from the ground by the travel of said wheel carriage, and means to control said drive whereby the conveyers may be selectively driven.

5. A straw windrowing attachment for harvester threshers, said attachment comprising a frame adapted to be arranged behind the thresher part of the harvester thresher, a pair of conveyers carried transversely end to end on said frame, and means to drive the conveyers in opposite directions including means to drive the conveyers selectively.

6. A straw windrowing attachment for harvester threshers, said attachment comprising a frame adapted to be arranged behind the thresher part of the harvester thresher, a pair of conveyers carried transversely end to end on said frame, means to drive the conveyers selectively and in opposite directions, said conveyers being positioned so that their inner ends receive the straw from the thresher part, and means to deflect all such straw onto one or the other of said conveyers.

7. A straw windrowing attachment for harvester threshers, said attachment comprising a frame adapted to be arranged behind the thresher part of the harvester thresher, a pair of conveyers carried transversely end to end on said frame, means to drive said conveyors selectively in opposite directions, and means to deflect the straw from the thresher part onto one or the other of said conveyers.

8. A straw windrowing attachment for harvester threshers having a thresher part provided with a straw discharging hood at its rear end, said attachment comprising a frame supported rearwardly of the thresher part, said frame carrying a pair of endless conveyers arranged transversely end to end with their inner ends disposed under said hood, means to drive the conveyers oppositely and selectively, and a deflector to direct all the straw from the hood onto one or the other of said conveyers.

9. A straw windrowing attachment for harvester threshers having a thresher part provided with a straw discharging hood at its rear end, said attachment comprising a wheel carried frame adapted to trail rearwardly of the thresher part, said frame carrying a pair of endless conveyers arranged transversely end to end with their inner ends disposed under said hood, means to drive the conveyers oppositely and selectively, and a deflector to direct all the straw from the hood onto one or the other of said conveyers.

ALEXUS C. LINDGREN.
CLEMMA R. RANEY.